(12) United States Patent
Lambson

(10) Patent No.: US 6,269,702 B1
(45) Date of Patent: Aug. 7, 2001

(54) METHOD AND APPARATUS FOR MEASURING TORQUE

(76) Inventor: Vernon A. Lambson, P.O. Box 1063, Fallon, NV (US) 89707-1063

( * ) Notice: Subject to any disclaimer, the term of this patent is extended or adjusted under 35 U.S.C. 154(b) by 0 days.

(21) Appl. No.: 09/425,910

(22) Filed: Oct. 21, 1999

Related U.S. Application Data

(60) Provisional application No. 60/106,492, filed on Oct. 30, 1998.

(51) Int. Cl.$^7$ ........................................................ G01L 1/22
(52) U.S. Cl. ...................................................... 73/862.045
(58) Field of Search ........................ 73/862.041, 862.042, 73/862.043, 862.044, 862.045, 862.046, 862.08, 862.338

(56) References Cited

U.S. PATENT DOCUMENTS

| | | | |
|---|---|---|---|
| 4,444,061 | 4/1984 | Mathias | 73/862.06 |
| 4,471,663 | * 9/1984 | Wallace | 73/862.339 |
| 4,573,362 | 3/1986 | Amlani | 73/862.04 |
| 4,640,138 | 2/1987 | Meyer et al. | 7/862.04 |
| 4,821,582 | 4/1989 | Meyer et al. | 73/862.04 |
| 4,823,618 | 4/1989 | Ramming | 73/862.04 |
| 5,648,617 | 7/1997 | Cullen et al. | 73/862.045 |
| 5,837,909 | * 11/1998 | Bill et al. | 73/862.338 |
| 5,874,682 | * 2/1999 | Schafer et al. | 73/862.338 |

OTHER PUBLICATIONS

Throop, M.J. and McWatt, D.G., "Slipping Torque Converter Clutch Interface Temperature, Pressure and Torque Measurement Using Inductively Powered Radiotelemetry" *Ford Motor Company*, Paper No. 970679.

\* cited by examiner

*Primary Examiner*—Max Noori
(74) *Attorney, Agent, or Firm*—David V. Carlson; Seed IP Law Group PLLC

(57) ABSTRACT

A method and apparatus for measuring torque of a rotating shaft is provided. In one embodiment, the apparatus includes a transducer assembly that is attached to a shaft. The transducer assembly includes a first plate member, a plurality of webs extending from the first plate member and a second plate member connected to the webs. A plurality of strain gauges are mounted on the transducer assembly at selected locations and in selected patterns. As torque is applied to the shaft, the torsional load from the shaft causes stress in the first plate member, the web members, and the second plate member. The strain gauges measure this stress and generate signals that provide a measure of the stress. The signals transmitted from the sensing circuit are compared with calibration data, and the torque value is inferred. In one embodiment, the strain gauges are arranged in opposing pairs on the transducer assembly and electrically connected as a Wheatstone bridge, so that strain resulting from non-torsional loads is canceled from the measured signal, thereby improving torque measurement accuracy. In another embodiment, the strain gauges are located on thinned regions in the transducer assembly which are fashioned for the purpose of creating areas of localized high stress. In another embodiment, the transducer assembly includes a decoupling aperture. The decoupling aperture minimizes hysteresis due to warping and bending of the transducer assembly.

20 Claims, 12 Drawing Sheets

METHOD AND APPARATUS FOR MEASURING TORQUE

CROSS-REFERENCE TO RELATED APPLICATION

This application is a non-provisional application claiming priority from U.S. Provisional Patent Application No. 60/106,492, filed Oct. 30, 1998, now abandoned.

TECHNICAL FIELD

This invention relates to an apparatus and method for measuring torque, and more particularly, a structure and method that will measure the torque output of a rotating shaft.

BACKGROUND OF THE INVENTION

Engine crankshaft torque is an important factor in engine and vehicle performance. Fuel economy, drivability and operational smoothness in a vehicle driven by an automatic transmission are functions of transmission shift points and engine control parameters. Crankshaft torque is taken into account in order to optimize these shift points. The design and proper function of the drive train also must take into account crankshaft torque.

Crankshaft torque has been typically measured in test cells using highly specialized expensive dynamometer equipment and setups. The equipment, however, is large and very sensitive, making it totally unsuitable for vehicular applications.

Also, other attempts to measure engine crankshaft torque were made by machining "flats" into the engine crankshaft and installing stress or strain gauges onto the flats. As torque load is applied to the crankshaft, the strain gauges sense the induced stress load at their locations on the flats. The resulting signals from the strain gauges are compared with the torque calibration data, from which the torque values are inferred.

Such torque measuring devices are plagued by several problems. Life limiting modifications to the engine crankshaft are required for their installation, in addition to the difficulties and impracticalities of having to install sensors and physically load and calibrate each individual crankshaft, thereby disqualifying their use in commercial production vehicles. They also suffer from inaccuracy due to their inability to distinguish between stresses caused by torsional loads and stresses caused by non-torsional loads (i.e., axial loads, shear/radial loads, bending loads, or skew/misalignment loads).

The size constraints and accuracy problems inherent in prior art torque measuring devices (especially those utilizing slip rings) have greatly contributed to a resulting design cycle for the automobile drive train that is longer than the design cycle typical of the other primary automotive systems. The installation disadvantages of prior art torque measurement devices have also effectively precluded their incorporation into commercial production vehicles.

SUMMARY OF THE INVENTION

According to principles of the present invention, a method and apparatus for measuring torque of a rotating shaft is provided. In one embodiment, the apparatus includes a transducer assembly that is attached to a shaft. The transducer assembly includes a first plate member, a plurality of webs extending from the first plate member and a second plate member connected to the webs. A plurality of strain gauges are mounted on the transducer assembly at selected locations and in selected patterns to form a sensing circuit. The first plate is rigidly coupled to the shaft. As torque is applied to the shaft, the transducer assembly also rotates. The torsional load from the shaft causes stress in the first plate member, the web members, and the second plate member. The strain gauges are placed in locations of the transducer through which the load passes as it is carried by the transducer assembly. The strain gauges respond to this stress and generate signals that provide a measure of the induced stress. The signals transmitted from the sensing circuit are compared with calibration data, and the torque value is inferred.

In one embodiment, the strain gauges are arranged in opposing pairs on the transducer assembly and electrically connected as a Wheatstone bridge. In this embodiment, strain resulting from non-torsional loads is canceled from the measured signal, thereby improving torque measurement accuracy.

In another embodiment, the strain gauges are located on thinned regions in the transducer assembly. The thinned regions are fashioned for the purpose of creating areas of localized high stress. Preferably, they are designed to provide constant stress across each individual strain gauge.

In another embodiment, the transducer assembly includes a decoupling aperture. The decoupling aperture may include holes or slits, and may be disposed at any location throughout the transducer assembly. Appropriate application of the decoupling aperture minimizes hysteresis due to warping and bending of the transducer assembly.

DETAILED DESCRIPTION OF THE INVENTION

In a first embodiment, the inventive torque transducer is connected to an automobile drive train as it is being tested.

The first plate is coupled to the end of the crankshaft and the second plate is coupled to the flexplate or flywheel, which are used interchangeably herein. For convenience the term flywheel is used here in the broad sense to include the terms flexplate, connecting wheel or other connecting member between the crankshaft and the torque converter. The flywheel is coupled to the transmission via well-known bearings and coupling members and techniques. The output of the transmission is connected to a drive shaft or other load. The engine is then operated to provide power to rotate the shaft. Various loads are placed on the drive train throughout a test routine and the outputs of the strain gauges are sensed to obtain the torque throughout the test routine.

In an alternative embodiment, the torque transducer is coupled to the drive train of a consumer purchased vehicle that is driven by the end user. The output from the torque measurement is fed into an onboard electronic control unit as an input to provide fine-tune adjustments to vehicle operation. It may also be displayed to an operator in the form of torque and/or combined with the instantaneous rotational speed to provide a readout of the instantaneous horsepower.

Figure 1:
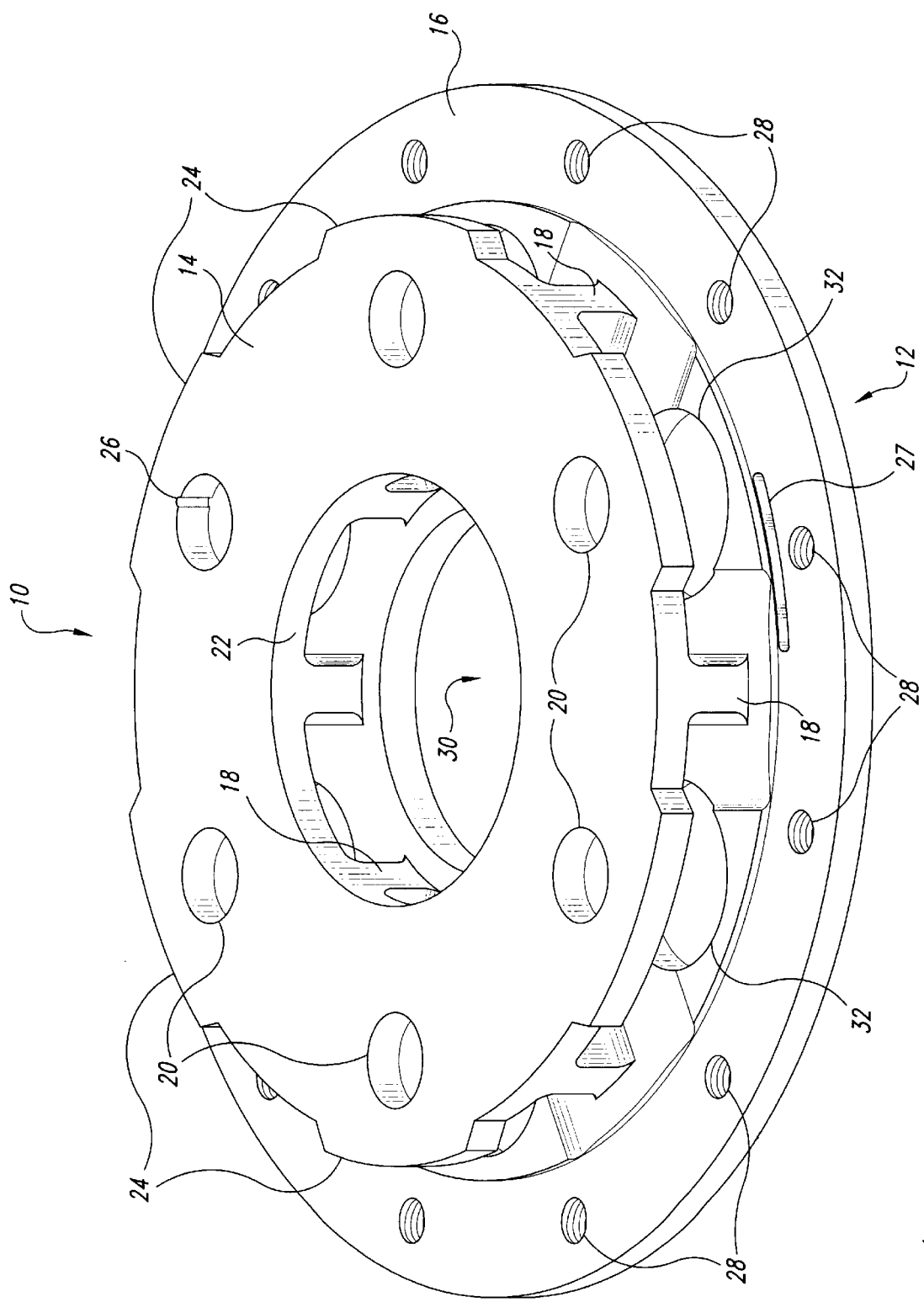
FIG. 1 is an isometric view of a torque transducer in accordance with an embodiment of the invention.

FIG. 1 is an isometric view of a torque transducer 10 in accordance with an embodiment of the invention. The torque transducer 10 includes an assembly 12 having a first plate member 14 attached to a second plate member 16 by a plurality of web members 18. The first plate member 14 has a plurality of first bolt holes 20 for bolting the first plate member 14 to a torque source, such as a crankshaft, and a first alignment aperture 22. The first plate member 14 also has tabs 24 proximate to the first bolt holes 20 for improved structural support. A notch 26 is provided in one of the first bolt holes 20 as an indicator of the offset hole matching that of the crankshaft.

Similarly, the second plate member 16 has a plurality of second bolt holes 28 for attaching the second plate member 16 to a load. The load may be a flywheel, a flexplate, transmission, or some other load. The second plate member 16 has a second alignment aperture 30, and may also have a plurality of decoupling apertures 32. In the embodiment shown in FIG. 1, the decoupling apertures 32 provide access to the first bolt holes 20. The second plate member 16 has an alignment pin aperture 33 (shown in FIG. 2A). One or more strain relief slits 27 are provided in an alternative embodiment, as explained elsewhere herein.

Figure 2A:
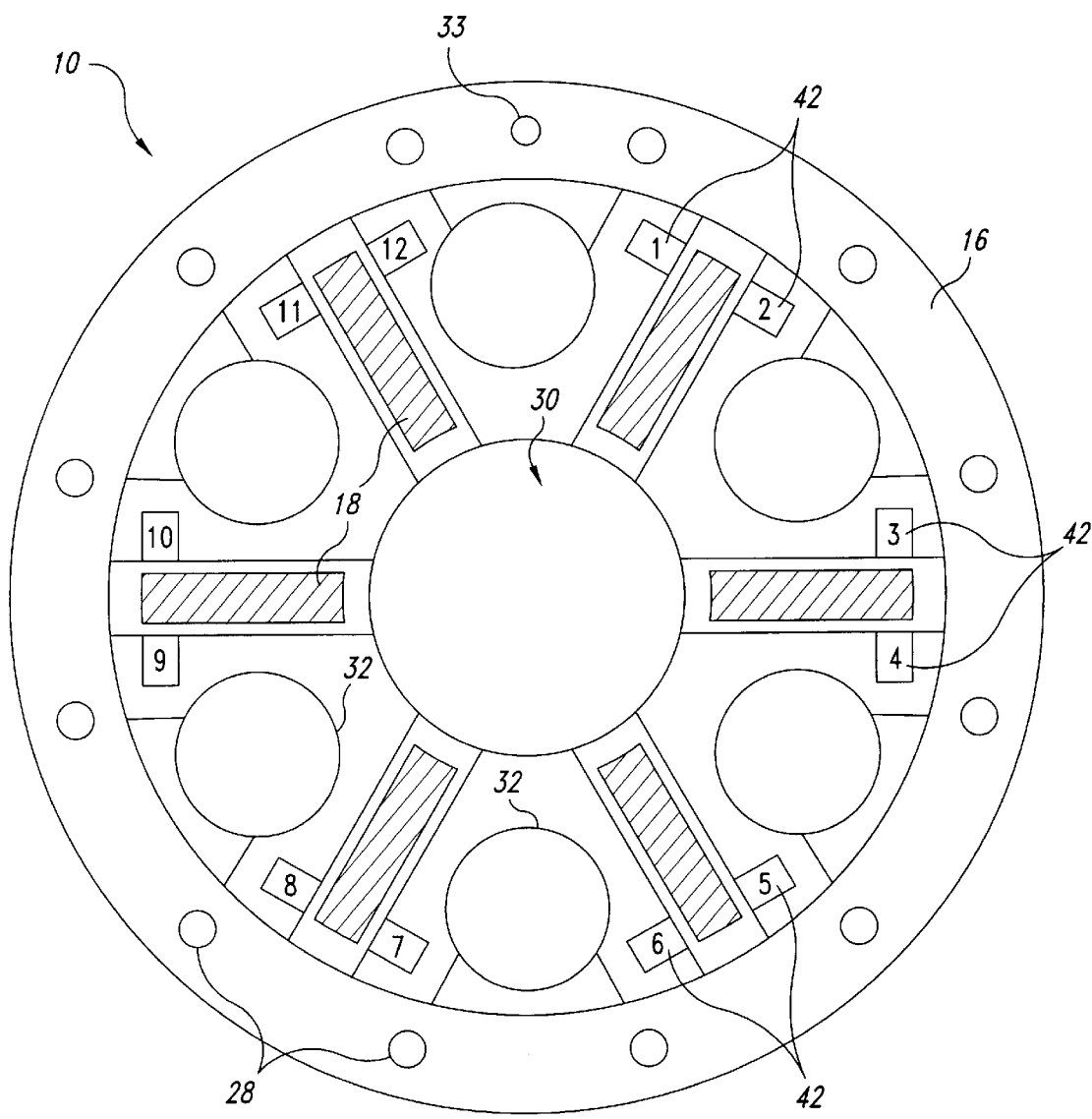
FIG. 2A is a cross-sectional view of the torque transducer of FIG. 1 in accordance with a second embodiment.

FIG. 2A is an axial, cross-sectional view of the torque transducer 10 of FIG. 1. Web members 18 are shown in cross-section. Strain gauges 42 are affixed to the surface of the second plate member 16 in pairs on opposite sides of the web members 18. In an alternative embodiment, the strain gauges 42 are affixed to the web members and are located on either side of each web member 18. In a further alternative embodiment, the strain gauges are affixed to the external side of the second plate member 16, in position directly opposed to those shown in FIG. 2A for purposes of thin film and/or production applications. The strain gauges 42 may be distributed at different locations and in different orientations, either singly or in pairs, on the surfaces of the torque transducer 10, other than are shown in FIG. 2A.

The location of the strain gauges is selected to provide a reliable torque measurement and reduce the effects, or even cancel out, stress as induced in the non-torque direction. For example, being positioned on either side of web members (or on the web members themselves) permits the stress from torque as the plate rotates to be measured in the second plate member. Stress from non-torque sources are canceled out by subtraction of signal responses.

Figure 2B:
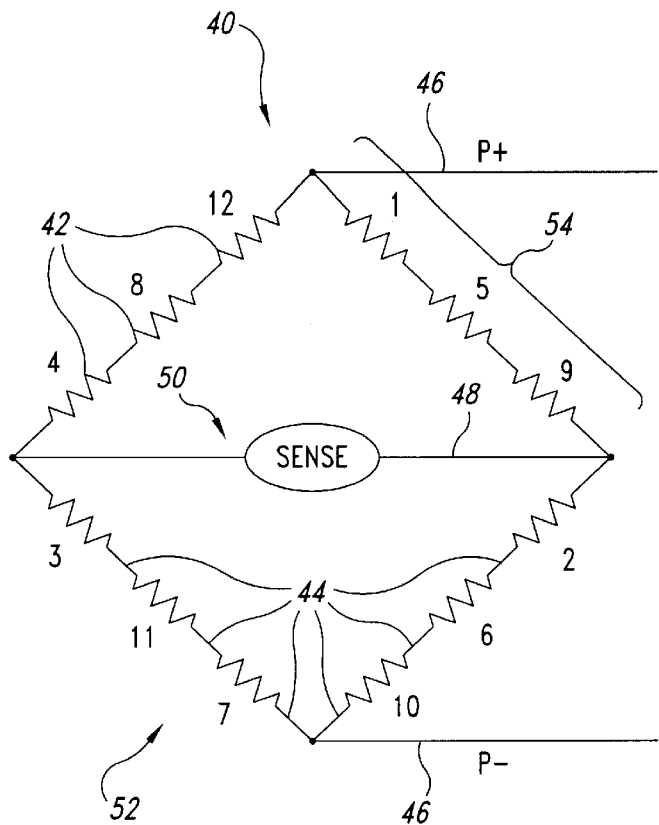
FIG. 2B is a partial circuit diagram of a sensing circuit for use with the torque transducer of FIG. 2A.

FIG. 2B is a circuit diagram of a sensing circuit 40 in accordance with one embodiment of the torque transducer 10 of FIG. 2A. The sensing circuit 40 includes the strain gauges 42, electrically connected to each other by conductive elements 44. Power leads 46 route electrical power to the strain gauges 42 of the sensing circuit 40, and primary signal leads 48 carry the measured signal 50 from the strain gauges 42 to signal conditioning and transmitting components (described below). A wiring notch (not shown) is provided on a surface of the second plate member 28, and the power leads 46 and/or primary signal leads 48 are routed along the wiring notch.

A variety of strain gauges 42 may be used, including thin-film and thick-film types. Thin-film gauges may be formed in a variety of ways, such as by successive masking and sputtering of alternate layers of appropriate conductive and insulative material. The electrical leads 44, 46 and 48 are also formed directly on the assembly 12 using appropriate techniques, such as sputtering an insulating layer, sputtering the conductor, etching if needed and then coating with a protective and insulating layer. The making of such strain gauges and conductive leads is known in the art and any acceptable technique may be used.

In the embodiment depicted on FIG. 2B, the strain gauges 42 are oriented on opposing sides of each web member 18, and are electrically connected in the manner of a Wheatstone bridge 52. The Wheatstone bridge 52 may be of the DC constant voltage or constant current variety or in one embodiment, an AC type. Non-torsional loads (i.e., axial loads, shear/radial loads, bending loads, or skew/misalignment loads) will induce a positive-valued strain on one side of the web member 18 and a negative-valued strain on the other. The strain gauges 42 associated with each web member 18 are oriented in a strategic manner on adjacent branches 54 of the Wheatstone bridge 52 so that the positive and negative strain values of non-torsional loads are electrically canceled from the measured signal 50 on line 48. In this way, the sensing circuit 40 combines one or more stress values with one or more other stress values to achieve cancellation of non-torsionally induced stress values, producing a measured signal 50 which is comprised only of stress values induced by torsional forces. In other words, by combining the additive effects of the Wheatstone bridge, the strategic placement of the strain gages on the transducer and the strategic wiring orientation of the strain gages in the Wheatstone bridge, the stresses induced by torsional loads only will be added and produce a net output signal from the Wheatstone bridge. At the same time, non-torsional loads will induce stresses that will be cancelled out leaving a net output from the Wheatstone bridge of zero for non-torsional loads.

One advantage of the above-described embodiment is that torque measurement accuracy is improved. The effects of non-torsional loads are electrically canceled and removed from the measured signal 50, thereby providing a more accurate measurement of the torque from the crankshaft.

Figure 3:
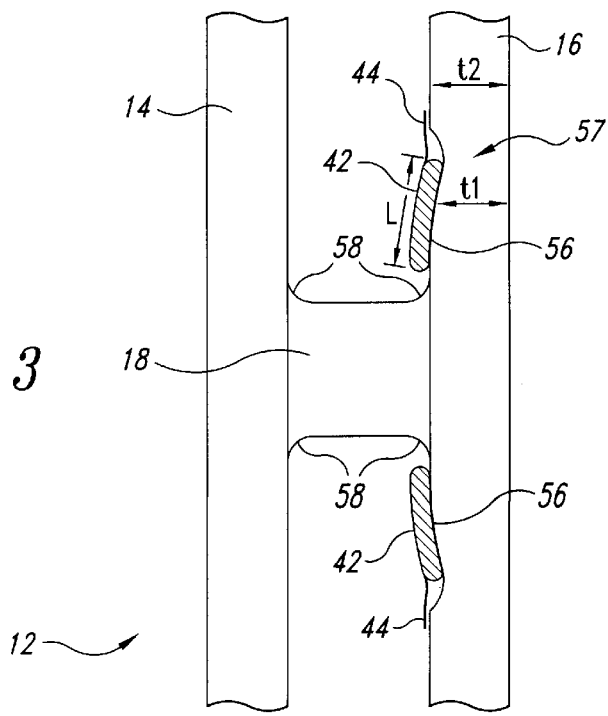
FIG. 3 is an enlarged partial radial view of strain gauges installed on a torque transducer of the embodiment of FIG. 1.

FIG. 3 is an enlarged partial radial view of a pair of strain gauges 42 mounted to the transducer assembly 12 in accordance with one embodiment of the invention. In this embodiment, the strain gauges 42 are positioned in a thin region 57 having a thickness t1 less than the thickness t2 of the main part of plate 16. The reduced thickness 57 is achieved by having recesses 56. The recesses 56 may be fashioned by varying the thickness of the second plate member 16 (or first plate member 14), and may be designed to provide approximately constant stress across each individual strain gauge 42. The recesses 56 are preferably located near regions of high stress concentration, such as near corner fillets 58 at the junctures of the web members 18 and the second plate member 16 (or first plate member 14), or may be used to create localized areas of high stress concentration in the transducer assembly 12.

An advantage of the above-described thin region 57 is that it improves torque measurement accuracy. By creating localized regions of high stress concentration, the measured signal 50 is strengthened, and signal-to-noise ratio improved. With only a slight difference in thickness between t1 and t2, a high amount of torque stress is concentrated in the region t1. In the embodiment shown, the stress is constant over an entire length L of the strain gauge 42 by having the thickness t1 vary over the length L based on distance from the web 18. Namely, the edge of the fillet 58 is a very high stress zone. If possible, the strain gauges 58 could be mounted there, or on the web. This is often impractical, due to the small curvature of the fillet or irregular surface and the physical size of the strain gages. Having a selected slope to the thin region 57 to keep a constant stress region provides uniform sensing by the strain gauge 42. By providing approximately constant stress across each individual strain gauge 42, improved signal quality and improved cancellation of non-torsional load effects may be achieved.

Figure 4:
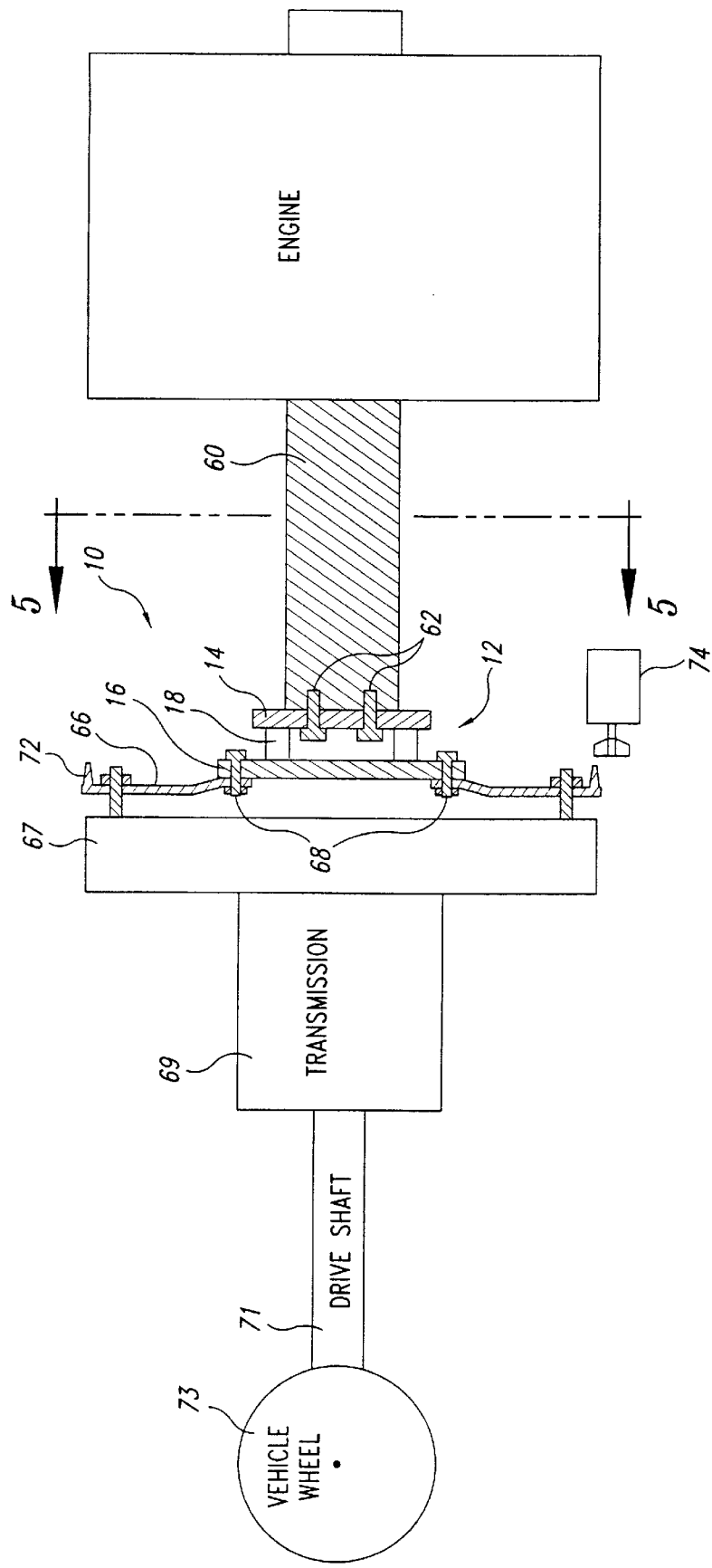
FIG. 4 is a schematic block diagram showing the torque transducer of FIG. 1 attached to an automobile drive train.

FIG. 4 is a side view of the torque transducer 10 of FIG. 1 attached to a drive train. The drive train includes crankshaft 60, a flywheel 66, a transfer member 67 (usually a torque converter), a transmission 69 and a drive shaft 71. The first plate member 14 is bolted to the end of the crankshaft 60 by crankshaft bolts 62. The second plate member 16 is bolted to the flywheel 66 using flexplate bolts 68. A ring gear 72 is located around the periphery of the flywheel 66 for engaging the gears of a starter motor 74. A coupling assembly 67, usually a torque converter in an automobile, but it could be any coupling assembly, connects to the flywheel 66 and also to the transmission 69. Transmission 69 receives power from the coupling assembly 67 and causes rotation of the drive shaft 71 at the selected speed to cause the vehicle wheel 73 to rotate and move the automobile forward. The parts of FIG. 4 are not to scale, and are shown in block and diagram form to show the torque transducer 10 as one component in the drive train. The power from the engine passes in series through the torque transducer 10 to the rest of the drive train, so that the full load passes through the torque transducer 10.

During the engine starting operation, as the starter motor 74 engages the ring gear 72, torque is applied to the second plate member 16, and the second plate member 16 begins to rotate. The second plate member 16 transmits torque through the web members 18 to the first plate member 14, which is resistant to rotational motion due to the inertial and frictional forces of the engine. Stresses develop throughout the transducer assembly 12, which are sensed by the strain gauges 42 of the sensing circuit 40 which can be monitored as necessary. Then, after the engine starts, torque is applied by the crankshaft 60 to the first plate member 14. During operation, the first plate member 14 may be bolted to a crankshaft of an engine, and the second plate member 16 may be bolted to a flywheel. As torque is applied to the first plate member 14 by the engine, the first plate member 14 begins to rotate, transmitting torque through the web members 18 to the second plate member 16. The second plate member 16 is resistant to the rotational motion due to the inertia of the flywheel and other inertial and frictional forces and the load. Thus, stresses develop in the first plate member 14, second plate member 16, and web members 18. The strain gauges 42 of the sensing circuit 40 measure the stresses at various locations across the transducer assembly 12, and a measured signal 50 is generated. When fuel is no longer supplied to the engine and the vehicle is coasting, the engine becomes the load and the vehicle wheels provide the power to rotate the drive train. The torque is now applied in a reverse direction on the torque transducer 10. This reverse of torque is sensed and the measurement provided as an output.

One advantage of the above-described embodiment is that the strain gauges 42 are not mounted on the crankshaft of the engine, but rather, are mounted on the transducer assembly 12. Therefore, little or no modification of the engine crankshaft is required. This improves the feasibility of implementing the torque transducer 10 on production vehicles, namely vehicles that are mass produced for consumer purchase and use.

Decoupling apertures 27 are disposed in the second plate member 16 in a first embodiment. In an alternative embodiment, there are no decoupling apertures. Namely, the plates 14 and 16 are solid plates with no holes or with only bolt holes. An advantage of providing decoupling apertures is that they reduce the potential of hysteresis by preventing loads which would cause buckling and/or plate movement at the bolt holes 28 that may be experienced, for example, as the applied torque transitions from small positive values to small negative values, and vice versa, such as when transitioning from the running mode of the engine to the coasting mode of the engine as described above. In an alternative embodiment, additional decoupling apertures may be sized and located throughout the transducer assembly 12. For example, an embodiment of an additional decoupling aperture is shown in FIG. 1 as a strain relief slit 27 disposed in the second plate member 16. One or more such strain relief slits 27 may be added to reduce hysteresis caused by warping and pinching at bolt points.

Figure 5:
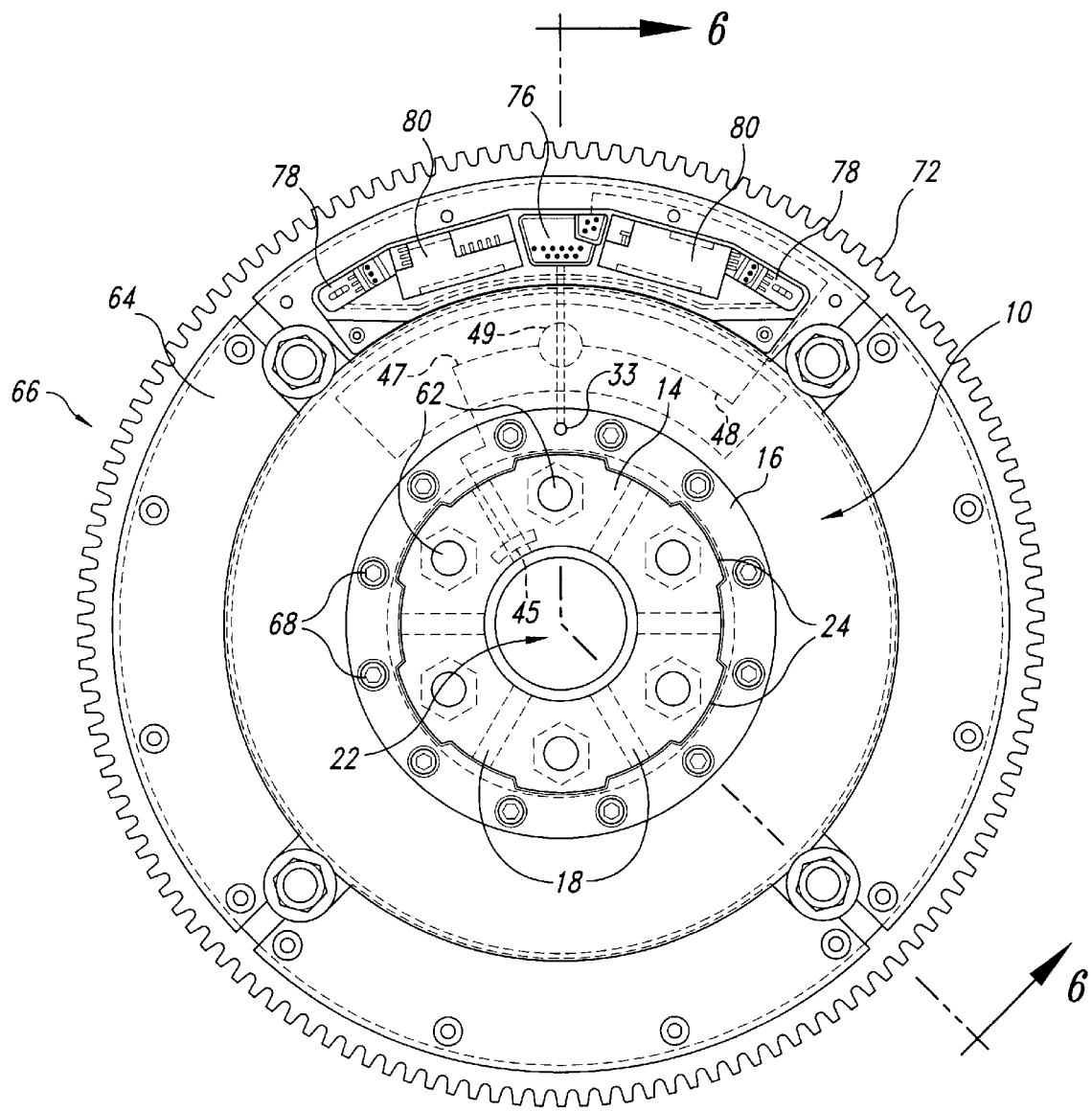
FIG. 5 is an axial view of the torque transducer of FIG. 1 coupled to a flex plate.

FIG. 5 is an axial view of the torque transducer 10 of FIG. 1 coupled to the flywheel 66 taken along line 5—5 of FIG. 4. In this embodiment, the sensing circuit 40 includes a connector 76, isolation transformers 78, and a transmitter 80, which are mounted to the flywheel 66. The wiring connections, as shown in FIG. 2B, are brought together in connector 45 and routed via line 47 to a second connector 49, where they are carried via line 48 to the main connector 76. The flywheel 66 has teeth 72 for engaging the starter motor. The term flywheel 66 as used in the specification and claims refers generally to the plate which connects the crankshaft through to the transmission assembly and includes flexplates, as they are called in automatic transmissions or other similar type plates.

In this embodiment, which is only one of numerous configuration options, as many as eight transmitters can be mounted in the flywheel support hardware. This allows the data from up to 28 sensors of a multiplicity of types (i.e. pressure, temperature, strain, etc.) and locations to be simultaneously transmitted from the rotating hardware to the external receivers. A removable retainer and protective cover 64 is installed in each of the four quadrants of the flywheel. FIG. 5 is shown with one of the four covers 64 removed.

Figure 6:
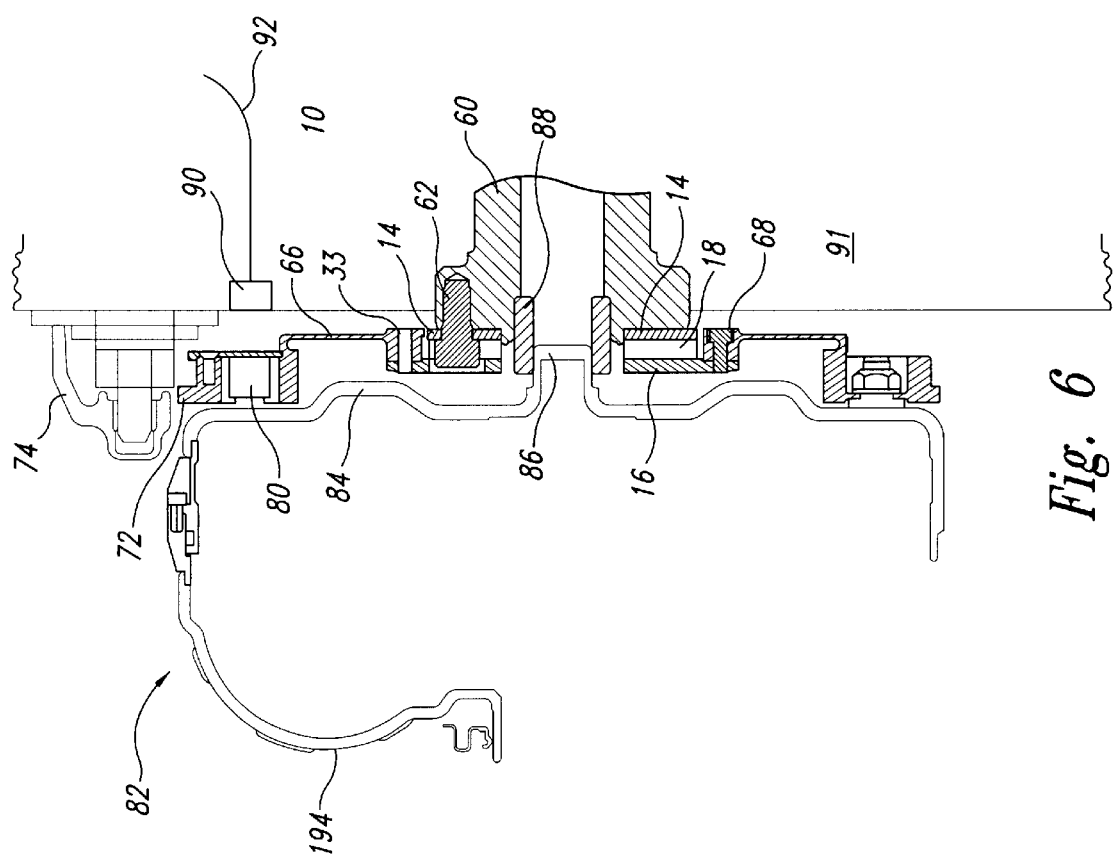
FIG. 6 is a side view of the assembly of FIG. 5 taken along lines 5—5.

FIG. 6 is a partial side view and cross-sectional view taken along lines 6—6 of the torque transducer 10 of FIG. 5 installed in a drive train of an automatic transmission-driven automobile. In this embodiment, the first plate member 14 of the torque transducer 10 is bolted to the crankshaft 60 using crankshaft bolts 62, and the second plate member 16 is bolted to the flywheel 66 using flexplate bolts 68. A torque converter 82 having a front cover 84 and a pilot guide 86 are also attached to the flywheel 66. The pilot guide 86 passes through the second alignment aperture 30 of the second plate member 16, and the first alignment aperture 22 of the first plate member 14, and slidably engages a pilot bearing 88 (or bushing) disposed within the crankshaft 60. A receiver antenna 90 is located on an engine block 91, and is oriented to receive the measured signal 50 transmitted by the transmitter 80. Secondary signal leads 92 are electrically connected from the receiver antenna 90 to the receive and/or sense and control equipment. A starter 74 is positioned to engage the teeth 72 of the flywheel 66 when the vehicle is to be started.

During operation, the measured signal 50 is transmitted from the Wheatstone bridge 52 along the primary signal leads 48 to the connector 76, where it is routed to the transmitter. There the signal is conditioned and amplified. Although signal conditioning and amplification have typically been included as part of the transmitter 80, they may alternately be performed by separate components depending upon the application and circuit design.

The transmitter 80 then transmits the measured signal 50 to the receiver antenna 90, where it is carried by the secondary signal leads 92 to any desired location, such as another automobile electronic control circuit, a data display or processing system. The signal 50 is continuously transmitted by the transmitter and continuously received by the receiving antenna 90. Power to the transmitter and the sensor circuit can be provided by inductive pick up, local generator or other acceptable technique. The isolation transformers allow power to transfer to each transmitter while keeping them electrically isolated to prevent cross talk interference.

An advantage of the embodiment described above is that by transmitting the measured signal from the rotating transmitter 80 to the stationary receiving antenna 90, no physical connection is necessary. Wear and tear of parts which require a physical contact, such as in a slip ring arrangement, is eliminated, and maintenance of the system may be reduced.

Figure 7:
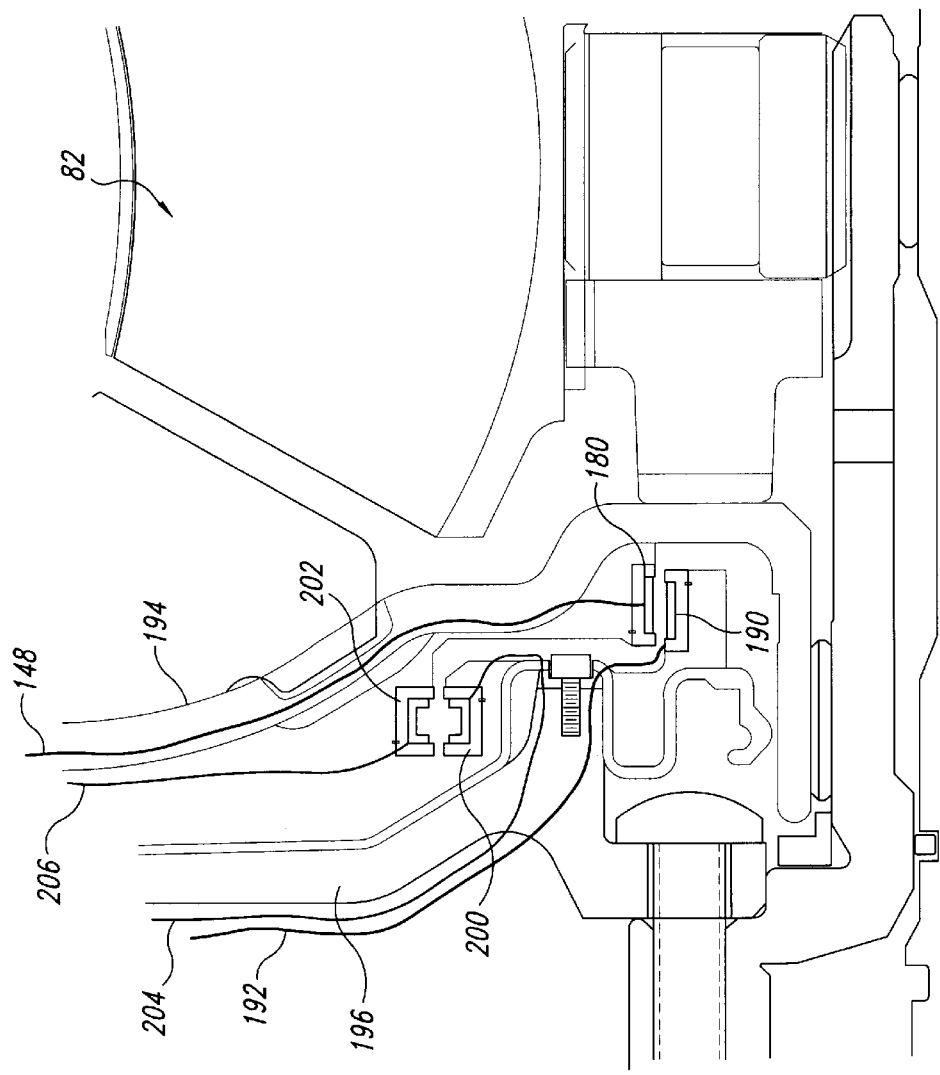
FIG. 7 is a partial side view of an antenna and power supply transfer in accordance with an embodiment of the invention.

FIG. 7 is a partial side view greatly enlarged of an antenna installation and an inductive power supply pick up in accordance with another embodiment of the invention. In this embodiment, the torque converter 82 includes a back cover 194 facing a transmission case 196. The torque converter 82 is rotating rapidly and the transmission case 196 is stationary. The torque transducer assembly 10 is at the front of the torque converter 84, and is not shown because the scale is too large. A transmitting antenna 180 is mounted on the back cover 194, and a receiving antenna 190 is mounted on the transmission case 196. Primary signal leads 48 are routed from the strain gauges 42 of the transducer assembly 12 to the transmitter 80. The conditioned and transmitted signal is routed via lead wires 148 from the transmitter over the surface of the torque converter 82 to the transmitting antenna 180. Secondary signal leads 192 are routed from the receiving antennae 190 over the transmission case 196 and connected to the receiver and/or controlling equipment.

A first inductive element 200 is mounted on the transmission case 196, and a second inductive element 202 is mounted on the back cover 194 of the torque converter 82. Primary power leads 204 are routed over the transmission case 196 and connected to the first inductive element 200. Secondary power leads 206 are connected to the secondary inductive element 202, and are routed over the back cover 194 of the torque converter 82, and down the front cover 84 to provide power to the transmitters 80 and the sensing circuit, including the strain gauges 42 of the transducer assembly 12. One or both of these inductive elements 200 and 202 are coils in a cylindrical pattern around the respective locations to provide power transfer, the coils acting similar to an air gap transformer to transfer power from one coil to another.

In operation, power is supplied to the first inductive element 200. The power is inductively transferred to the second inductive element 202, where it is routed to the electrical circuit, including the transmitter 80, the isolation transformer 78 and connector 76, and via the transmitter 80 to the strain gauges 42 of the transducer assembly 12. Similarly, the measured signal 50 is routed from the strain gauges 42 of the transducer assembly 12 to the transmitter and then by the primary signal leads 148 to the transmitting antenna 180, where it is transmitted to the receiving antenna 190, and then transmitted by the secondary signal leads 192 to the desired location. In an alternative, the first inductive element 200 could be a magnet and the second inductive element 202 a wire coil so that the power is generated by the rotation of the torque converter 84 relative to the transmission 196. Other forms of power generation are also possible.

An advantage of the embodiment shown in FIG. 7 is that the signal is received at the transmission where it may be more convenient to pick up and route to other automobile components than from the engine. Power is supplied by the inductive elements and no physical connection is necessary. Wear and tear of parts which require a physical contact is eliminated, and maintenance of the system may be reduced.

Another advantage of this embodiment is that the receiving antenna 190 and the first inductive element 200, and their associated leads, are located on the transmission case 196 rather than the engine block 91. Thus, undesirable modifications of the engine block 91 are avoided.

Figure 8:
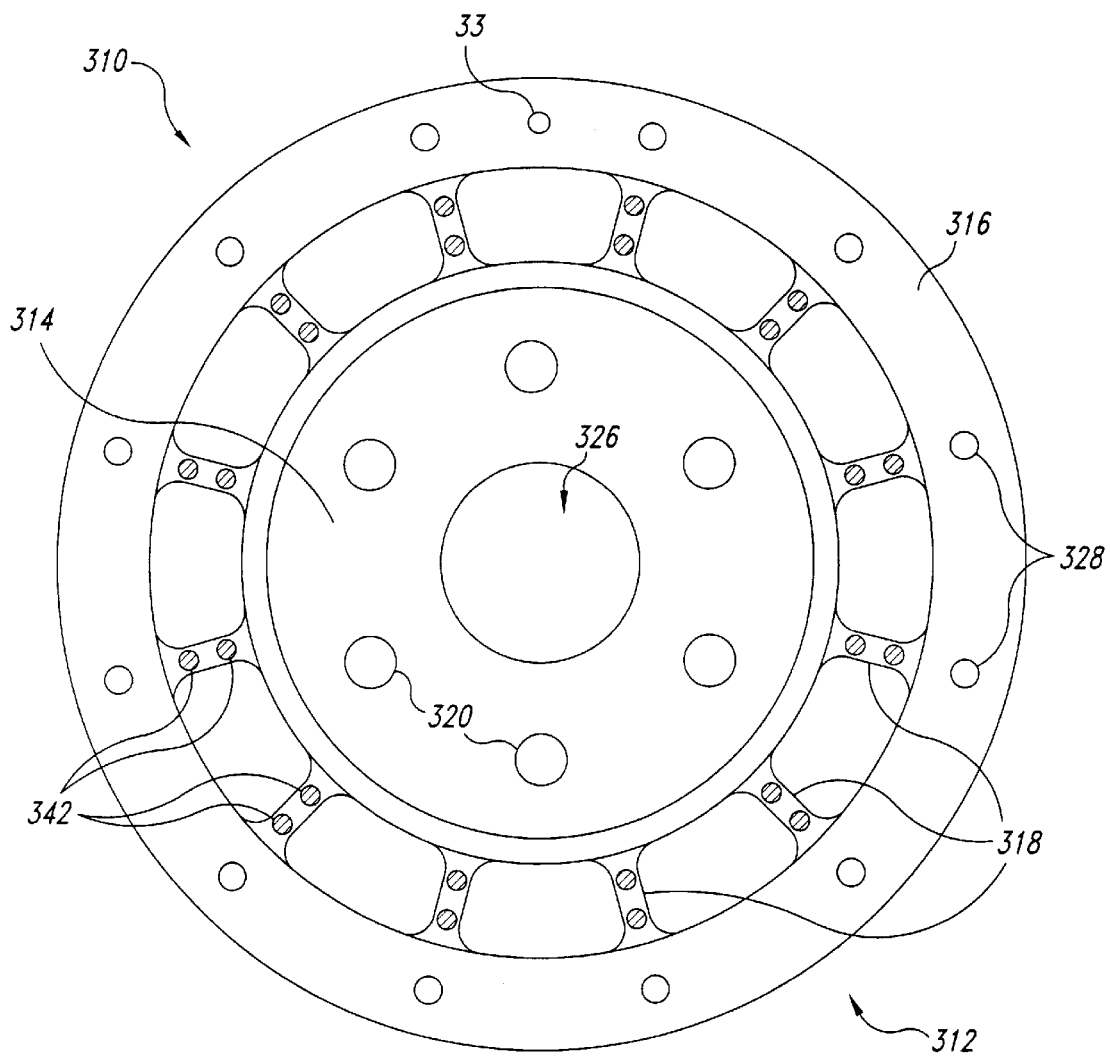
FIG. 8 is an axial view of a torque transducer in accordance with an alternate embodiment of the invention.

FIG. 8 is an axial view of a torque transducer 310 in accordance with an alternate embodiment of the invention. In this embodiment, the torque transducer 310 includes a transducer assembly 312 having a first plate member 314, a second plate member 316 radially disposed about the first plate member 314, and a plurality of web members 318 which couple the first plate member 312 to the second plate member 316. Thus, rather than being axially spaced apart as described above and shown in FIG. 1, the first plate member 314 and second plate member 316 are radially spaced apart.

The first plate member 314 has first bolt holes 320 and a first alignment aperture 326. The second plate member 316 has second bolt holes 328. A plurality of strain gauges 342 are distributed over the surfaces of the transducer assembly 312. It should be noted that the strain gauge 342 may be distributed over any of the surfaces of the transducer assembly 312, and not just the web members 318 as depicted in FIG. 8.

Figure 9:
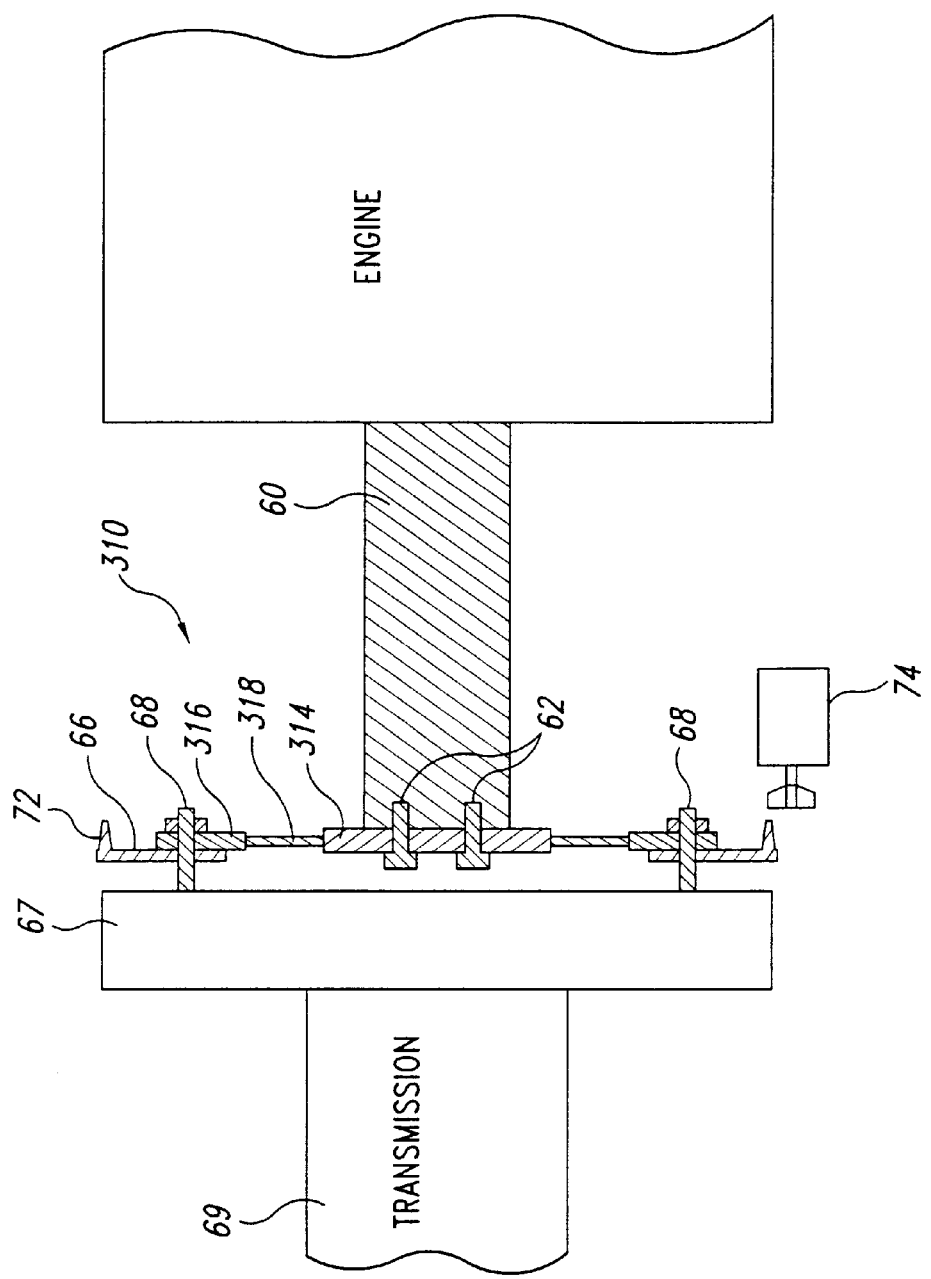
FIG. 9 is a side view of the torque transducer of FIG. 8 attached to a crankshaft and a flexplate.

FIG. 9 is a side view of the torque transducer 310 of FIG. 8 attached to a crankshaft 60 and a flywheel 66. The first plate member 314 is bolted to the crankshaft 60 with crankshaft bolts 62. The second plate member 316 is bolted to the flywheel 66 using flexplate bolts 68. The ring gear 72 is located around the periphery of the flywheel 66 for engaging the starter motor 74.

An advantage of the embodiment of the torque transducer 310 shown on FIGS. 8 and 9 is that it is more compact in the axial direction. This improves installation in the drive train of production vehicles because less modification of other vehicle components is required. The only modification required will be to the flywheel 66 in some designs. The radial webs 318 are designed such that they also have the advantage that other undesirable signals can be easily subtracted from the sensed torque signal by canceling out the undesired effects utilizing the previously described methods.

Figure 10:
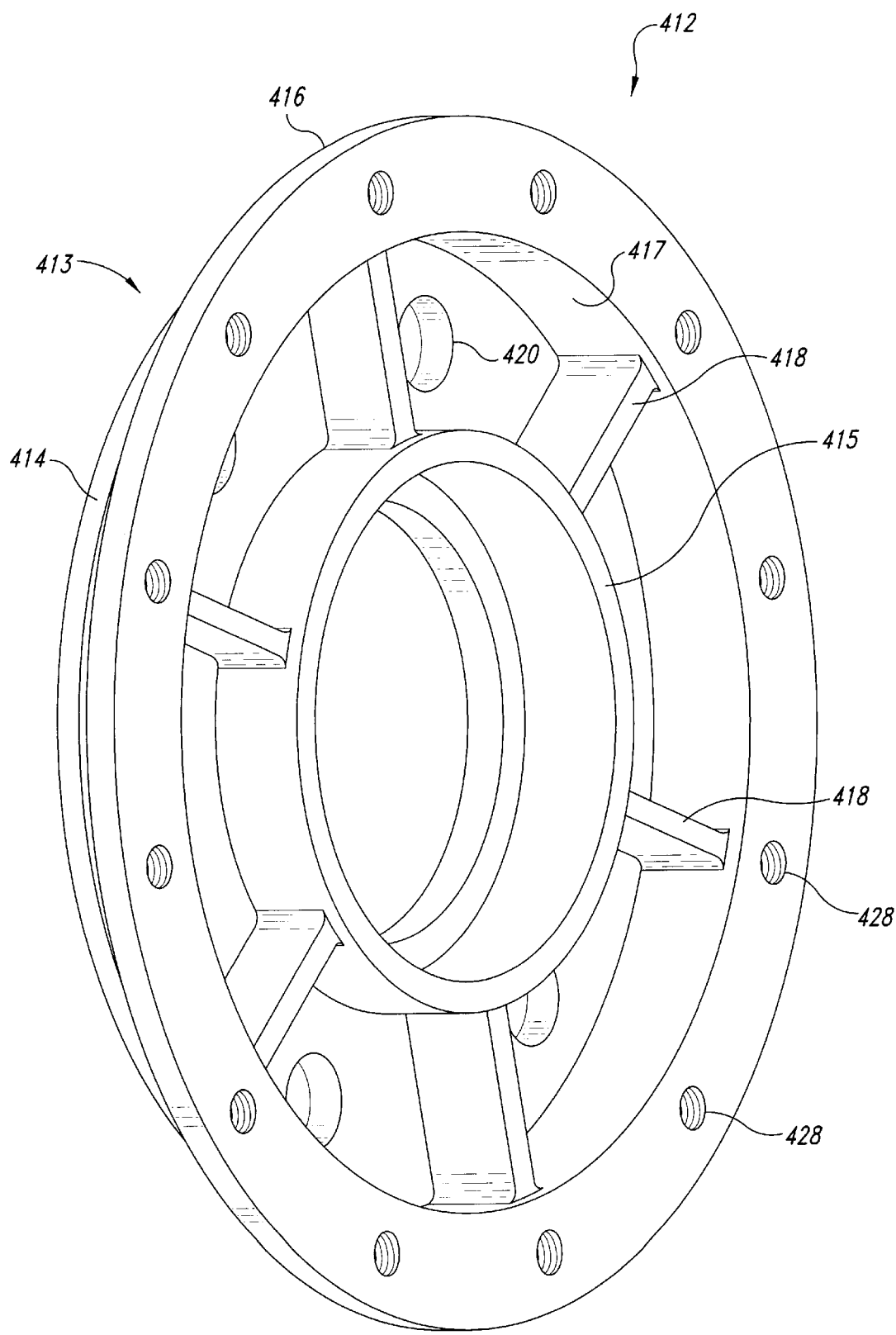
FIG. 10 is an isometric view of a torque transducer in accordance with another alternate embodiment of the invention.
Figure 11:
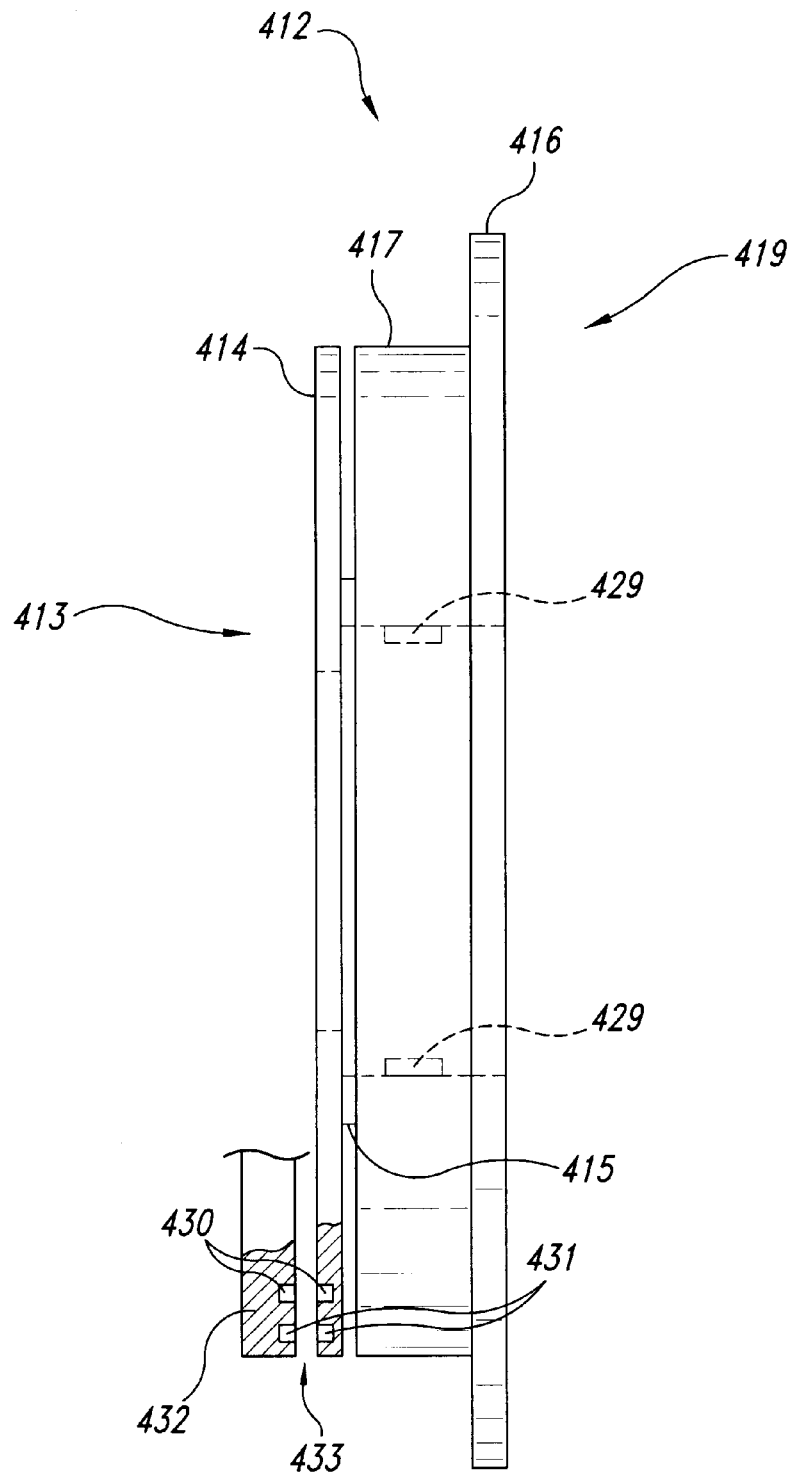
FIG. 11 is a side elevation view of the torque transducer of FIG. 10.

FIG. 10 is an isometric view of a torque transducer assembly 412 in accordance with another alternate embodiment of the invention. FIG. 11 is a side elevational view of the torque transducer assembly 412 of FIG. 10. In this embodiment, the transducer assembly 412 includes a first plate member 413 having an approximately planar first annular portion 414 and a first cylindrical portion 415 attached thereto, and a second plate member 419 having an approximately planar second annular portion 416 and a second cylindrical portion 417 attached thereto. The second cylindrical portion 417 is partially disposed about the first cylindrical portion 415, and is attached to the first cylindrical portion 415 by a plurality of radial web members 418.

Similar to the above-described embodiments, the first annular portion 414 has a plurality of first bolt holes 420 disposed therethrough for securing the first annular portion to a source of torque. The second annular portion 416 has a plurality of second bolt holes 428 for coupling the torque transducer assembly 412 to, for example, a flywheel of an automobile (not shown). The torque transducer assembly 412 shown on FIGS. 10 and 11 is outfitted with a sensing circuit, and an electrical power transmission circuit. The sensing circuit of torque transducer assembly 412 provides measured torque signals to a signal transmitter for transmission to a receiver located external to the torque transducer assembly. The electrical power transmission circuit of torque transducer assembly 412 provides electrical power to the sensing circuit from an external source of electrical power.

Figure 12:
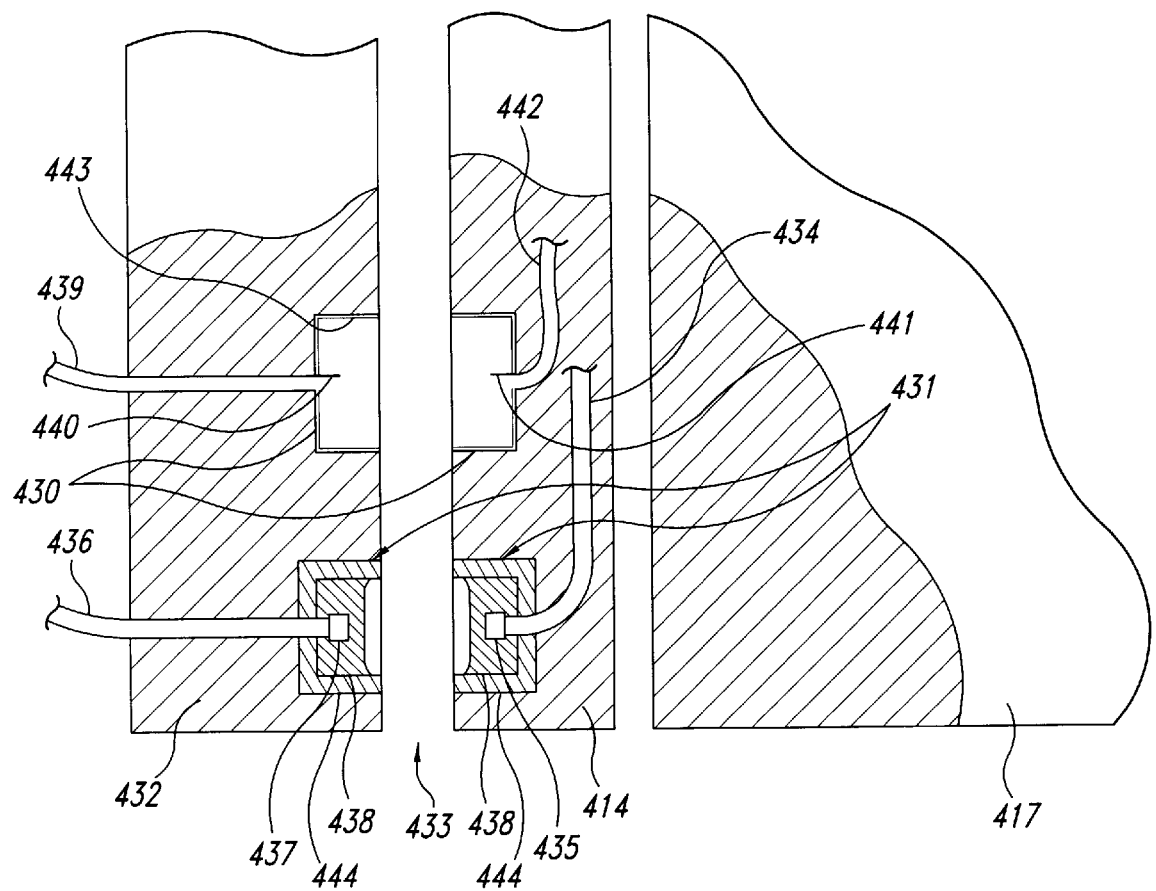
FIG. 12 is an enlarged partial sectional view of an embodiment of the antenna and power supply circuit of the torque transducer of FIG. 10.

FIGS. 11 and 12 show an alternate embodiment of an electrical power transmission circuit, and an alternate embodiment of a sensing and signal transmission circuit, used with the torque transducer assembly 412. FIG. 11 shows a stationary member 432 which is placed in close proximity to the torque transducer 412, but separated from the first annular portion 414 by a narrow gap 433. The stationary member 432, shown in this embodiment as a circular plate, may be attached to the rear of an automotive engine, or any other stationary assembly. The stationary member 432 and first annular portion 414 have opposing circumferential grooves 430 in which a pair of opposing radio antennas 440, 441 of the sensing circuit are located (see FIG. 12), and a pair of circumferential grooves 431 which contain the inductive elements 435, 437 of the power transmission circuit.

FIG. 12 illustrates the placement of the inductive elements 435, 437 and radio antennas 440, 441 in this embodiment. The first inductive element 435 is located in the circumferential groove 431 of the first annular portion 414 of torque transducer 412 and is electrically isolated from the first annular portion 414 by a dielectric insulating material 438. The insulating material 438 and the inductive element 435 are separated from the annular portion 414 by a channel shaped ferrite material 444 which serves to focus the magnetic lines of flux toward the channel shaped ferrite material 444 which is located about the inductive element 437. The first inductive element 435 is connected to the transmitter 429 by electrical conductors 434. In the stationary member 432, the second inductive element 437 is located in a circumferential groove 431 in the stationary member 432 in a position substantially opposite from the first inductive element 435, and is similarly electrically isolated from the stationary member 432 by a dielectric insulating material 438. The insulating material 438 and the inductive element 437 are also similarly separated from the stationary member 432 by a channel shaped ferrite material 444 which serves to focus the magnetic lines of flux toward the channel shaped ferrite material 444 which is located about the inductive element 435. The second inductive element 437 is connected to an external source of electrical power by electrical conductors 436. Therefore, the first and second inductive elements 435 and 437 form the primary and secondary elements of an inductive circuit for transferring electrical power from an external electrical power source to the transmitter 429. Inductive element 437 is the primary inductive element and inductive element 435 is the secondary inductive element.

It should be recognized that the circumferential grooves 431 may contain a number of inductive elements, sized, shaped, and configured in accordance with the power requirements of the sensing and transmitting circuit. Alternately, the inductive elements may be replaced by a plurality of permanent magnets which are located at predetermined intervals in the circumferential groove 431 in the stationary member 432.

As shown in FIG. 11, the present embodiment utilizes two transmitters 429 to collect torque data from the sensing elements (not shown) and to transmit the torque data to a receiver (not shown) via a transmitting antenna 441. The transmitters 429 are positioned on an inside surface of cylindrical portion 415, and are located near the axial center line of the torque transducer 412 in radially opposing positions on torque transducer 412. The transmitter positions shown in FIG. 11 are recognized as advantageous since they will permit rotational imbalances in torque transducer 412 to be minimized, and will decrease the centrifugal load acting on the transmitters 429 during rotational operation.

Although the use of multiple transmitters 429 on torque transducer 12 enhances the performance and reliability of the sensing system by allowing increased amounts of data to be transmitted to the receiver while potentially decreasing the duty cycle on each transmitter 429, the number of transmitters 429 in the sensing circuit could be reduced to a single transmitter. In addition, the multiple transmitters 429 may be arranged and utilized so that a redundant transmitter capability is attained, thus offsetting the effects of a transmitter or local component failure. It should be recognized, therefore, that a number of transmitters 429 may be used on the torque transducer 412, and that they may be placed in any location along torque transducer 412, depending on the torque transducer design or sensing system requirements.

As best shown in FIG. 12, the sensing circuit in this embodiment also includes the transmitter antenna 441 located in a circumferential groove 430 on the first planar member 414, and connected to the transmitter 429 by a suitable transmission line 442. A receiver antenna 440 is located in a circumferential groove 430 on the stationary member 432 substantially opposite from the circumferential groove 430 containing the transmitter antenna. The receiver antenna 440 is similarly connected to the receiver by a transmission line 439. Since the radio frequency signals are confined to the space comprised of circumferential grooves 430, the transmitter antenna 441, receiver antenna 440 and circumferential grooves 430 form a wave guide for the transmission of radio frequency signals between the transmitter 429 and the receiver equipment. Accordingly, the circumferential grooves 430 containing the transmitter antenna 441 and receiver antenna 440 may be constructed using wave guide materials 443 in order to enhance the efficiency of radio frequency transmission along the waveguide. The specific transmitting and receiving antenna design configuration details can vary greatly and are highly dependent on the torque transducer, sensing system, or application requirements.

Although this embodiment of the electrical power transmission and sensing circuits have been described with reference to the torque transducer assembly 412, it should be recognized that this embodiment is equally applicable to other torque transducer assembly embodiments.

The transducer assembly embodiment 412 provides a hearty, compact design that advantageously provides desirable installation features and improved durability over alternate embodiments. The first and second plate members 413, 419 having first and second cylindrical portions 415, 417, respectively, advantageously improves stiffness and durability of the assembly 412 over alternate embodiments. The operational life-expectancy of the transducer assembly is thereby extended.

According to one embodiment, a plurality of torque transducers are provided at different locations in the drive train. This permits the measurement of the torque at different locations, while the vehicle is traveling on the road and encountering a variety of road conditions. In the embodiment described, the torque transducer is connected immediately behind the engine, prior to the transmission. This permits torque measurement of the direct power provided by the engine. The torque information being provided to the onboard computer is the necessary feedback information which enables, the onboard computer to continuously adjust and optimize all of the engine control parameters for all operating conditions that are encountered while operating the vehicle. In a further embodiment, an additional torque transducer is provided at the output of the transmission, prior to the drive shaft. The additional torque transducer permits direct measurement of torque on the drive train itself which will be applying power to the wheels. Any torque changes caused by the transmission shifting through various gears can therefore be sensed and provided to the user or to an on-board computer which can use the data to coordinate the shifting points under electronic control.

As a still further alternative embodiment, torque transducers may be placed at different locations within the transmission itself. The torque from a first gear or any other gear can be measured, as compared to the input torque and a shifting point for each individual gearing change can be specifically sensed and selected to produce a smooth transition of the preferred transfer of power to the wheels. Also the new continuously variable transmission (CVT) and the automatically shifting manual type transmission (no torque converter), being developed could utilize this torque measurement system throughout the transmission and drive train, for both development and production applications by providing continuous data feedback to on-board computer control systems, instrumentation readout devices, or other data acquisition systems or equipment.

Similarly, a torque transducer could be placed inside the rear differential, or at the respective outputs of the differential for providing a direct measure of the torque being applied to the wheels. Or, on a front wheel drive, it could be positioned at the appropriate axle locations which provide power to drive the wheels. This way, individual wheel torque and slippage can be sensed and also controlled. This will provide improved traction control, operational safety and driving performance, both on and off road and in inclement weather conditions. It could also be used as an onboard diagnostic tool for engines and transmissions. All types of transmissions, power trains, and engine systems not limited to but including those from automotive to industrial, and from marine to aerospace, could benefit from this enabling technology.

The invention described herein is useful to measure torque with a motor/drive train combination of any type or application. It can be used with an automobile drive train, whether gas, diesel, electric, propane, etc. It can also be used with an airplane engine and drive train; an oil well drilling rig; a pump, such as a water or oil well pumping system; hydroelectric generators and motors; or any other system that uses a motor connected to a drive train. The motor and drive train combinations shown herein thus include any of the above combinations and applications.

From the foregoing, it will be appreciated that an improved method and apparatus for measuring torque has been shown and described. Although embodiments of the invention have been described herein for purposes of illustration, various modifications may be made without deviating from the spirit of the invention. Thus, the present invention is not limited to the embodiments described herein, but rather is defined by the claims which follow.

What is claimed is:

1. A transducer for sensing torque from a rotateable shaft comprising:
   a first planar disk extending in a first plane and having a plurality of apertures therethrough so that said disk is adapted to be coupled to the rotateable shaft;
   a first plurality of web members extending perpendicular from the first planar disk, in a direction away from said shaft;
   a second planar disk coupled to the web members, the second planar disk extending in a plane parallel to the first planar disk;
   a first plurality of pairs of strain gauges coupled to the second planar disk, one pair of strain gauges being positioned adjacent the coupling point between each web within the first plurality of webs and the second planar disk, with a first strain gauge within each pair being positioned on a first side of a web and a second strain gauge in the pair being positioned on an opposite side of the respective web;
   a series electrical connection between each first strain gauge of each pair; and
   a series electrical connection between each second strain gauge of each pair.

2. The apparatus of claim 1 wherein the arrangement of pairs of the strain gauges is a physical arrangement, with the strain gauges of the pair physically positioned symmetrically to each other about a selected feature of the transducer assembly.

3. The apparatus according to claim 1 wherein the strain gauges are thin-film gauges.

4. The apparatus according to claim 1 wherein the strain gauges are thick-film gauges.

5. The apparatus according to claim 1, further including a sensing circuit having a transmitting antenna.

6. The transducer according to claim 1 wherein the strain gauges are coupled in a Wheatstone bridge electrical circuit configuration.

7. The apparatus according to claim 6 wherein the number of strain gauges are grouped together in groups of four and each group has one strain gauge in each respective leg of the Wheatstone bridge to cancel out non-torque stresses in the transducer assembly.

8. The apparatus according to claim 1 wherein the transducer assembly includes a plurality of thin regions that are thinner than other regions on the transducer assembly, the strain gauges being affixed to the thin regions.

9. The apparatus according to claim 1, further comprising a power supply circuit electrically connected to the strain gauges.

10. The apparatus according to claim 9 wherein the power supply circuit includes at least one first inductive element and at least one second inductive element, said second inductive element moving relative to the first inductive element when power is being transferred.

11. The apparatus according to claim 1, further comprising an engine having a crankshaft, the crankshaft being rigidly attached to the first plate member.

12. The apparatus according to claim 1, further comprising a drive train having a flywheel, the flywheel being rigidly attached to the second plate member.

13. The transducer according to claim 6 further including:
a second plurality of web members extending perpendicular from the first planar disk, in a direction away from said shaft and coupled to the second planar disk;
a second plurality of pairs of strain gauges coupled to the second planar disk, one pair of strain gauges being positioned adjacent the coupling point between each web within the second plurality of webs and the second planar disk, with a first strain gauge within each pair being positioned on a first side of a web and a second strain gauge in the pair being positioned on an opposite side of the same respective web;
a series electrical connection between each first strain gauge of each pair;
a series electrical connection between each second strain gauge of each pair and
the first pair of strain gauges of the first plurality forming a first leg of the Wheatstone bridge, the second pair of strain gauges of the first plurality forming a second leg of the Wheatstone bridge, the first pair of strain gauges of the second plurality forming a third leg of the Wheatstone bridge, and second pair of strain gauges of the second plurality forming a fourth leg of the Wheatstone bridge.

14. A transducer for sensing torque from a rotateable shaft comprising:
a first planar disk extending in a first plane and having a plurality of apertures therethrough so that said disk is adapted to be coupled to the rotateable shaft;
a pair of web members extending perpendicular from the first planar disk, in a direction away from said shaft, the first web member in said pair being positioned at a mirror image location with respect the second web member in the pair about a central plane that is perpendicular to the first planar members and passes though the center of the first planar disk;
a second planar disk coupled to the pair of web members, the second planar disk extending in a plane parallel to the first planar disk;
a pair of strain gauges coupled to the second planar disk, one pair of strain gauges being positioned on the second planar disk adjacent the coupling point between each web and the second planar disk, with a first strain gauge within each pair being positioned on a first side of a web and a second strain gauge in the pair being positioned on an opposite side of the respective web;
a Wheatstone bridge circuit having four legs composed of the pairs of the strain gauges, with the first strain gauge of the first web of the pair being in a leg of the Wheatstone bridge opposite the first strain gauge of the second web of the pair and the second strain gauge of the first web being in a leg of the Wheatstone bridge opposite the second strain gauge of the second member of the web, the first and second strain gauges being in adjacent legs to each other.

15. The transducer according to claim 14 further including a second pair of web members that are in a mirror image position with respect to each other about a central plane that passes through the center of the first planar disk, each of the second pair having a pair of strain gauges on adjacent sides coupled to the second planar member and positioned in series to corresponding legs of the Wheatstone bridge.

16. A transducer assembly for sensing torque from a rotateable shaft comprising:
a first planar disk extending in a first plane and having a plurality of apertures therethrough so that said disk is adapted to be coupled to the rotateable shaft;
a first plurality of web members extending perpendicularly from the first planar disk, in a direction away from said shaft;
a second planar disk coupled to the web members, the second planar disk extending in a plane parallel to the first planar disk;
a recessed region positioned on the second planar disk, located adjacent each side of each web member;
a strain gauge positioned within the recessed regions on the second planar disk.

17. The transducer according to claim 16 further including a strain relief slit adjacent each web member extending into said second planar disk.

18. The transducer according to claim 17 wherein said strain relief slit extends completely through said second planar disk.

19. The transducer according to claim 16 further including a decoupling aperture adjacent each web member extending into said second planar disk.

20. The transducer according to claim 19 wherein said decoupling aperture extends completely through said second planar disk.

* * * * *